United States Patent
Gaal et al.

(10) Patent No.: US 9,509,543 B2
(45) Date of Patent: Nov. 29, 2016

(54) METHOD AND APPARATUS THAT FACILITATES INTERFERENCE REDUCTION IN WIRELESS SYSTEMS

(75) Inventors: Peter Gaal, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1559 days.

(21) Appl. No.: 12/824,123

(22) Filed: Jun. 25, 2010

(65) Prior Publication Data

US 2011/0158211 A1 Jun. 30, 2011

Related U.S. Application Data

(60) Provisional application No. 61/220,983, filed on Jun. 26, 2009.

(51) Int. Cl.
  *H04L 27/26* (2006.01)
  *H04L 25/02* (2006.01)
  *H04W 4/00* (2009.01)

(52) U.S. Cl.
  CPC ......... *H04L 27/2647* (2013.01); *H04L 25/023* (2013.01); *H04L 25/0206* (2013.01)

(58) Field of Classification Search
  CPC ........... H04L 27/2647; H04L 25/0206; H04L 25/023
  See application file for complete search history.

(56) References Cited

U.S. PATENT DOCUMENTS

| 7,986,922 | B2 | 7/2011 | Glazko et al. | |
|---|---|---|---|---|
| 2002/0186778 | A1* | 12/2002 | Agami et al. | 375/261 |
| 2004/0048576 | A1* | 3/2004 | Hildebrand et al. | 455/67.3 |
| 2004/0203458 | A1* | 10/2004 | Nigra | 455/67.13 |
| 2005/0052990 | A1* | 3/2005 | Lomnitz | 370/208 |
| 2009/0003470 | A1* | 1/2009 | Waltho | 375/260 |
| 2009/0109925 | A1 | 4/2009 | Nakamura et al. | |
| 2010/0150220 | A1* | 6/2010 | Boher et al. | 375/232 |
| 2010/0157924 | A1* | 6/2010 | Prasad et al. | 370/329 |
| 2010/0189199 | A1* | 7/2010 | Lou et al. | 375/341 |

(Continued)

FOREIGN PATENT DOCUMENTS

| CN | 101326754 A | 12/2008 |
|---|---|---|
| CN | 101409605 A | 4/2009 |

(Continued)

OTHER PUBLICATIONS

International Search Report and Written Opinion—PCT/US2010/040113, International Search Authority—European Patent Office—Jan. 24, 2011.

(Continued)

*Primary Examiner* — Alpus H Hsu
*Assistant Examiner* — Walter Divito
(74) *Attorney, Agent, or Firm* — Ke Liu

(57) ABSTRACT

Techniques for managing interference in a wireless communication system are disclosed. In one aspect, an estimated interference associated with data transmission over a plurality of subcarriers on an uplink is determined The estimated interference may relate to intermodulation products associated with a parallel transmission over the plurality of subcarriers. Based at least partly on the estimated interference, data received on the downlink can be processed, and subcarriers can be selected for data transmission on the uplink. Additionally, resources can be assigned to a wireless device according to the estimated interference.

36 Claims, 12 Drawing Sheets

(56) References Cited

U.S. PATENT DOCUMENTS

2010/0322358 A1* 12/2010 Drumm et al. ............... 375/341
2012/0051415 A1* 3/2012 Huang et al. ................ 375/230

FOREIGN PATENT DOCUMENTS

| | | |
|---|---|---|
| JP | 2002171239 A | 6/2002 |
| JP | 2006087111 A | 3/2006 |
| JP | 2009519665 A | 5/2009 |
| JP | 2009124684 A | 6/2009 |
| TW | 200820648 A | 5/2008 |
| WO | WO2004045228 | 5/2004 |
| WO | 2007069210 A2 | 6/2007 |
| WO | WO2007096683 | 8/2007 |
| WO | WO2010045548 | 4/2010 |

OTHER PUBLICATIONS

Choi J.W, "An Improved Soft Feedback V-Blast Detection Technique for Turbo-MIMO Systems", Acoustics, Speech and Signal Processing, 2008. ICA SSP 2008. IEEE International conference on Mar. 31, 2008, pp. 3181-3184.
Taiwan Search Report—TW099121153—TIPO—Apr. 19, 2013.
European Search Report—EP15167956—Search Authority—Berlin—Aug. 31, 2015.

* cited by examiner

METHOD AND APPARATUS THAT FACILITATES INTERFERENCE REDUCTION IN WIRELESS SYSTEMS

CROSS-REFERENCE TO RELATED APPLICATIONS

This application claims the benefit of U.S. Provisional Patent Application Ser. No. 61/220,983 entitled "METHOD AND APPARATUS FACILITATING INTERFERENCE MITIGATION FOR NON-CONTIGUOUS TRANSMISSIONS," which was filed Jun. 26, 2009. The aforementioned application is herein incorporated by reference in its entirety.

BACKGROUND

I. Field

The following description relates generally to wireless communications, and more particularly to methods and apparatuses that facilitate interference reduction.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present concepts of one or more embodiments in a simplified form as a prelude to the more detailed description that is presented later.

In accordance with one or more embodiments and corresponding disclosure thereof, various aspects are described in connection with reducing interference in wireless communication systems. In one aspect, methods and computer program products are disclosed for facilitating wireless communications. Such embodiments include determining an estimated interference associated with a data transmission over a plurality of subcarriers on an uplink, and processing data received over at least one subcarrier on a downlink based at least in part on the estimated interference.

Another aspect relates to an apparatus for wireless communications. The apparatus includes a processor configured to execute computer executable components stored in a memory. The computer executable components include an estimation component and a signal processing component. The estimation component is configured to determine an estimated interference associated with a data transmission over a plurality of subcarriers on an uplink. The signal processing component is configured to process data received over at least one subcarrier on a downlink based at least in part on the estimated interference.

Additional aspects relate to an apparatus that includes means for determining an estimated interference associated with a data transmission over a plurality of subcarriers on an uplink. The apparatus also includes means for processing data received over at least one subcarrier on a downlink based at least in part on the estimated interference.

According to another aspect, methods and computer program products are disclosed for facilitating wireless communications at a base station. Such embodiments include determining an estimated interference associated with a data transmission by a wireless device over a plurality of subcarriers, and assigning resources to the wireless device based at least in part on the estimated interference.

Yet another aspect relates to an apparatus for wireless communications. The apparatus includes a processor configured to execute computer executable components stored in a memory. The computer executable components include an estimation component and an assigning component. The estimation component is configured to determine an estimated interference associated with a data transmission by a wireless device over a plurality of subcarriers. The assigning component is configured to assign resources to the wireless device based at least in part on the estimated interference.

Additional aspects relate to an apparatus that includes means for determining an estimated interference associated with a data transmission by a wireless device over a plurality of subcarriers. The apparatus also includes means for assigning resources to the wireless device based at least in part on the estimated interference.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
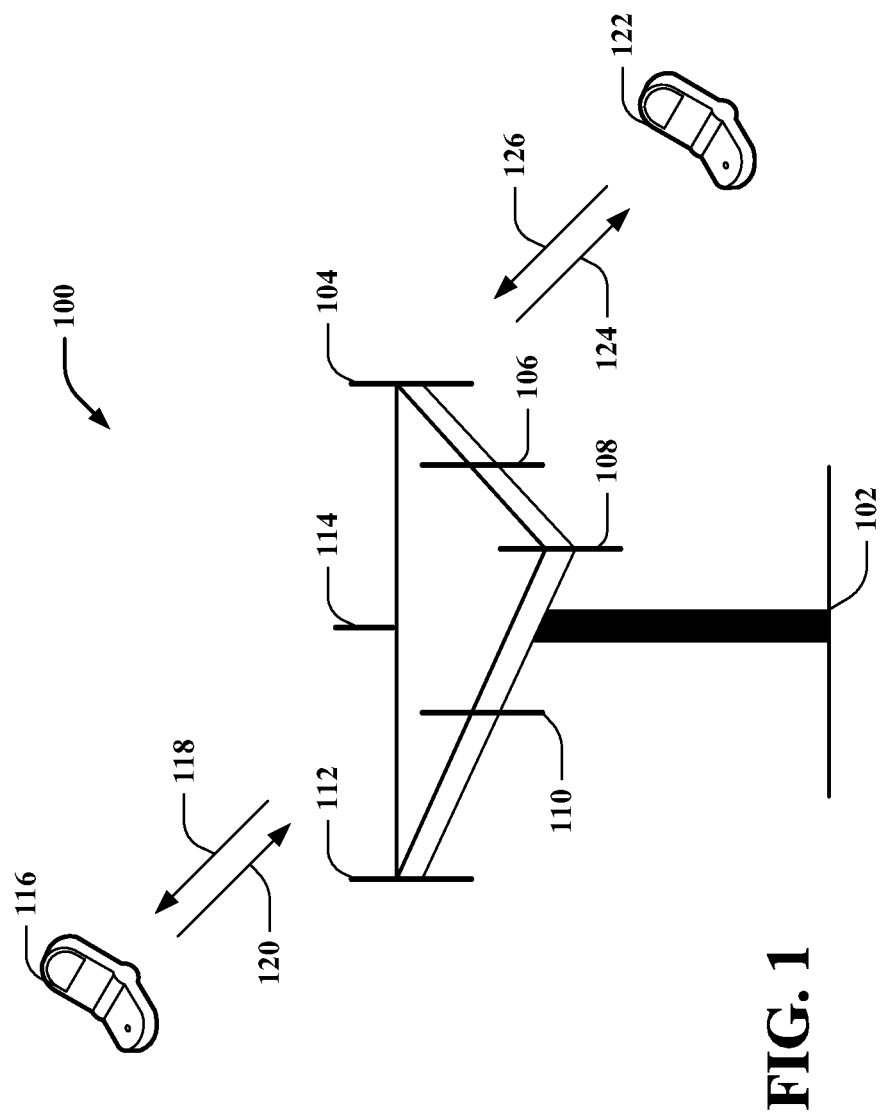
FIG. 1 shows an exemplary wireless communication system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Techniques for reducing interference in wireless systems are described herein. Among other things, transmitting signals in the presence of interference from intermodulation and/or harmonic products of received signals is discussed. In a particular embodiment, interference caused by the intermodulation and/or harmonic products are estimated, wherein the estimated interference is then used to zero out a set of log-likelihood ratio (LLR) metrics. In another embodiment, aspects are disclosed which avoid transmitting signals via subcarriers which may contribute to interference to received signals from intermodulation and/or harmonic products (hereinafter collectively referred to as "intermodulation products").

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi™), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols allow a recipient to automatically request retransmission of a packet that might have been received in error.

Various embodiments are described herein in connection with an access terminal An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), access point base station, or some other terminology.

Referring now to the drawings, FIG. 1 illustrates a wireless communication system in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Using beamforming to transmit to access terminals scattered randomly through an associated coverage can also reduce interference to access terminals in neighboring cells. .

Figure 2:
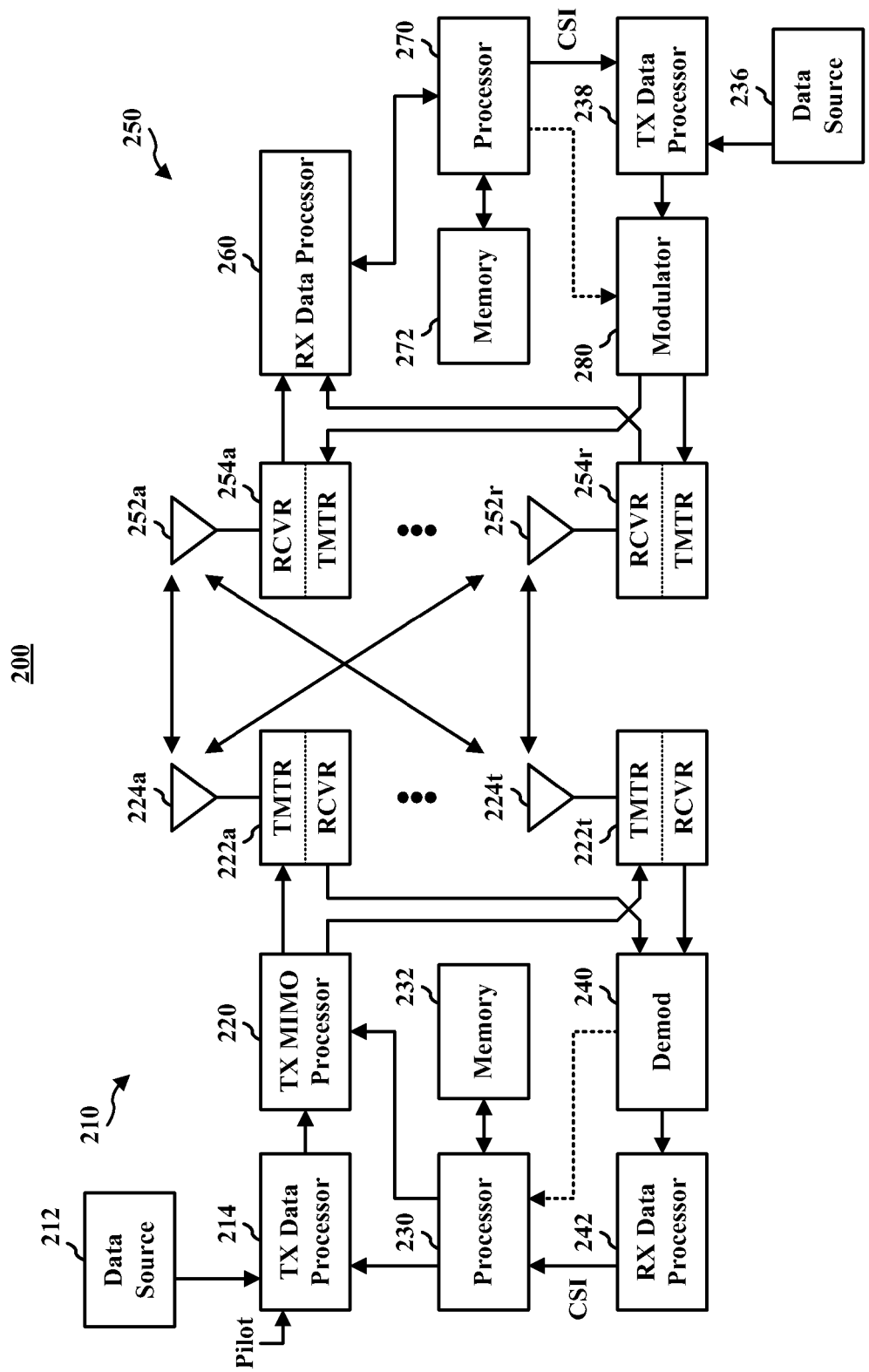
FIG. 2 illustrates aspects of an exemplary wireless network environment.

FIG. 2 shows an exemplary wireless communication system 200 having a base station 210 and an access terminal 250. For the sake of brevity, only one base station 210 and one access terminal 250 are shown. However, it will be appreciated that system 200 can include more than one base station and/or more than one access terminal, wherein additional base stations and/or access terminals can be substantially similar or different from the exemplary base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link (e.g., channel state information (CSI)) and/or the received data stream. The reverse link message can be processed by a TX data processor 238, which also receives traffic data for a number of data streams from a data source 236, modulated by a modulator 280, conditioned by transmitters 254a through 254r, and transmitted to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
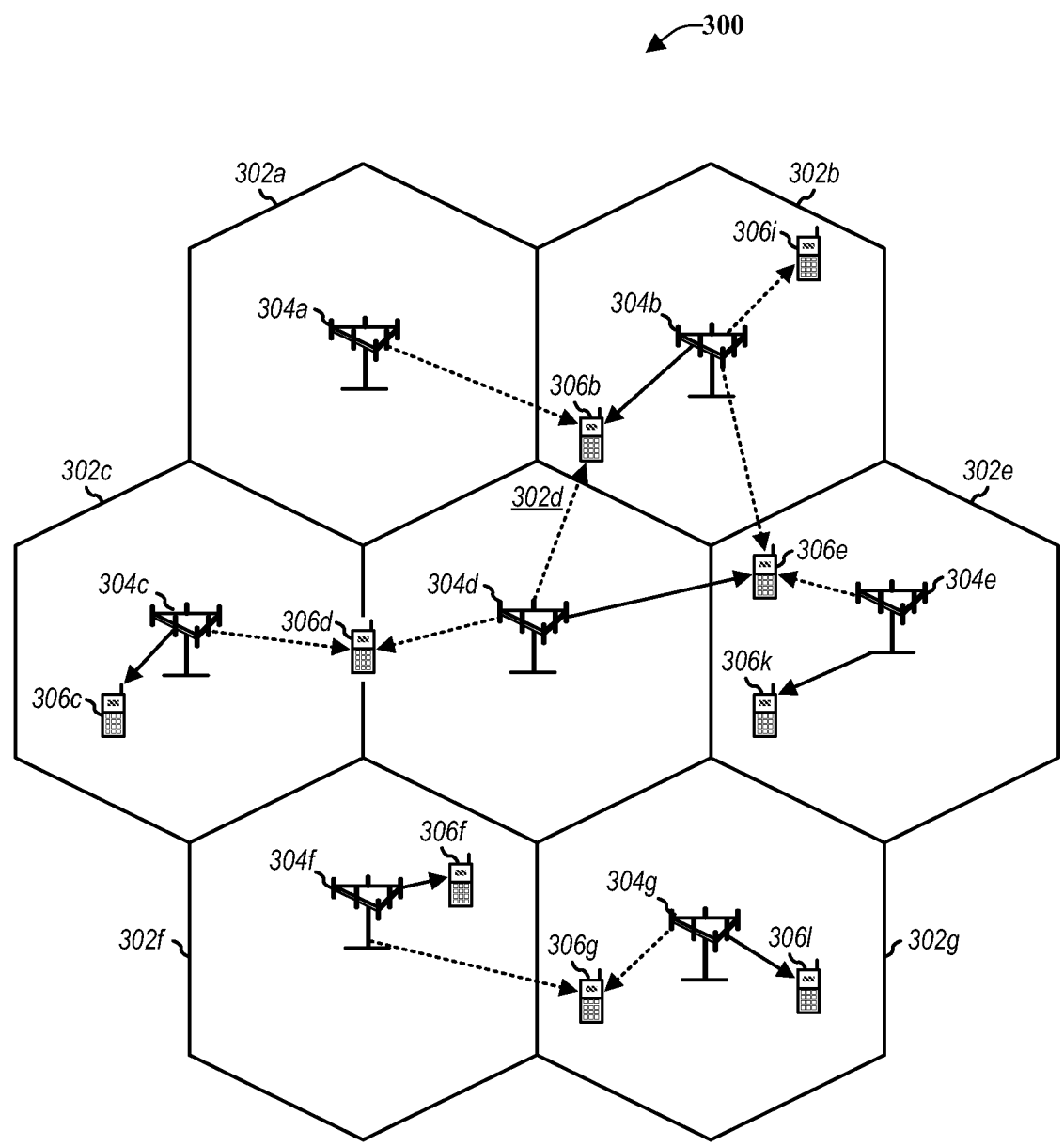
FIG. 3 depicts additional aspects of a wireless communication system.

Referring next to FIG. 3, an exemplary wireless communication system 300 configured to support a number of users is illustrated, in which various disclosed embodiments and aspects may be implemented. As shown in FIG. 3, by way of example, system 300 provides communication for multiple cells 302, such as, for example, macro cells 302a-302g, with each cell being serviced by a corresponding access point (AP) 304 (such as APs 304a-304g). Each cell may be further divided into one or more sectors (e.g. to serve one or more frequencies). Various access terminals (ATs) 306, including ATs 306a-306k, also known interchangeably as user equipment (UE) or mobile stations, are dispersed throughout the system. Each AT 306 may communicate with one or more APs 304 on a forward link (FL) and/or a reverse link (RL) at a given moment, depending upon whether the AT is active and whether it is in soft handoff, for example. The wireless communication system 300 may provide service over a large geographic region, for example, macro cells 302a-302g may cover a few blocks in a neighborhood.

ATs 306 can transmit on one or more carrier frequencies simultaneously. From the standpoint of ATs 306, parallel transmission on the uplink can include, among other things, non-contiguous carrier deployments or concurrent data transmission over multiple wireless access technologies (e.g., cellular, Wi-Fi, etc.). When an AT 306 is transmitting on frequencies $f_1, f_2, \ldots, f_n$, intermodulation products are created at $A_1 f_1 + A_2 f_2 + \ldots + A_n f_n$ (e.g., locations, frequency locations) where $A_1, A_2, \ldots, A_n$ are integers, and where $A_1 + A_2 + \ldots + A_n$ is the intermodulation order. For example, third order products can be created at $3 f_1$ or at $2 f_1 - f_2$. Intermodulation products are spurious waveforms that are generated due to the non-linearity of radio frequency (RF) elements such as a power amplifier in the transmit chain. If only one frequency or frequency range is involved in generating the spurious waveform, the products are commonly referred to as harmonics, whereas the products may be referred to generally as intermodulation products when more than one frequency is involved. As used herein, the term "intermodulation products" includes both harmonics and intermodulation products.

ATs 306 can receive downlink transmissions in any of the aforementioned frequency locations. For example, a downlink subcarrier may be located at $2 f_1 - f_2$. Intermodulation products associated with parallel data transmission on the uplink can interfere with and significantly degrade the signal-to-noise ratio (SINR) of the downlink reception. It is therefore desirable to mitigate the adverse impact of such intermodulation products on downlink subcarriers.

Figure 4:
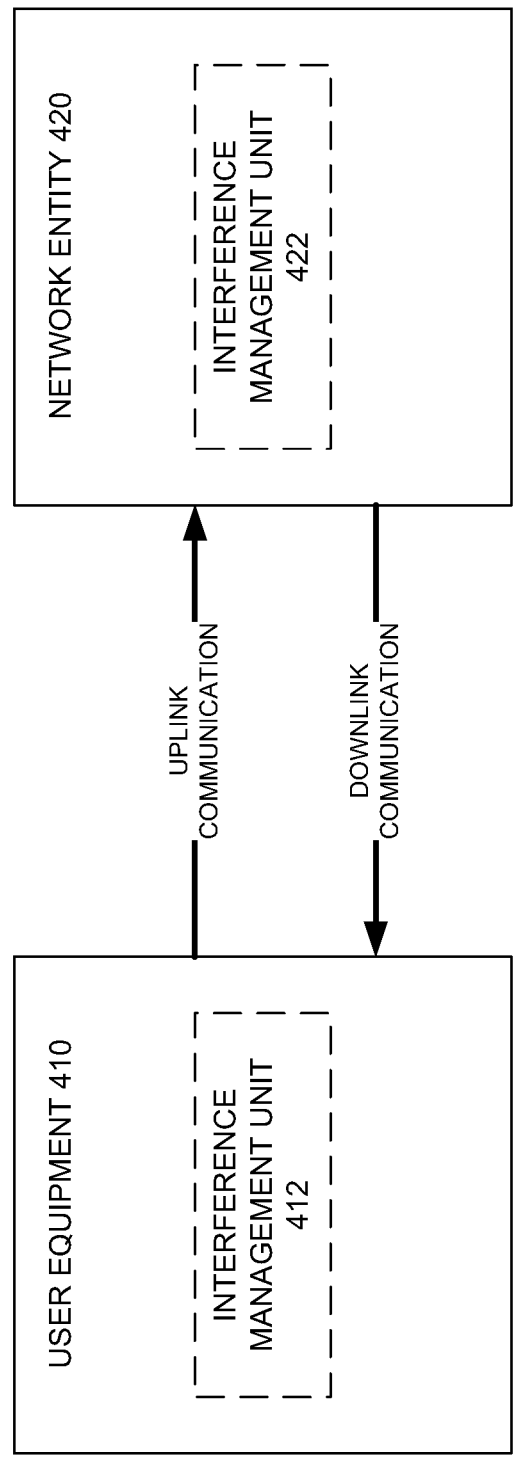
FIG. 4 shows an exemplary user equipment and network entity.

Turning now to FIG. 4, another exemplary wireless communication system 400 is illustrated. System 400 includes user equipment 410 (e.g., an access terminal) and network entity 420 (e.g., an access point), wherein user equipment 410 provides network entity 420 with an uplink communication, and wherein network entity 420 provides user equipment 410 with a downlink communication. As shown, user equipment 410 may include an interference management unit 412. Network entity 420 may also include an interference management unit 422. Interference management units 412, 422 facilitate transmitting signals in the presence of intermodulation or harmonic products of received signals.

Consider the case in which $f_1$ and $f_2$ represent a set of subcarriers used for data transmission on an uplink, and in which the associated intermodulation products $Af_1 + Bf_2$ are in a downlink bandwidth W centered on a downlink subcarrier $f_{DL}$. [$f_{DL} - W/2$, $f_{DL} + W/2$]. In this example, interference due to the intermodulation products can be high at downlink subcarrier $f_{DL}$. If unaccounted for in the decoding of the downlink, the decoding could fail due to the spurious log-likelihood ratios (LLRs) generated at this and other subcarriers affected by intermodulation products.

Interference management unit 412 and/or interference management unit 422 can be configured to estimate an interference to one or more downlink subcarriers from intermodulation products associated with the uplink data transmission and to compensate for the effects of such interference. For instance, it is contemplated that subcarriers can be identified where intermodulation products will be generated based on known frequency locations of an uplink data transmission. Interference management unit 412 of UE 410, for example, may process data received on the affected subcarriers by, among other things, zeroing log-likelihood ratios for modulation symbols on those subcarriers On the other hand, interference management unit 420 of network entity 420 may assign uplink/downlink resources to UE 410 based on the estimated interference so as to mitigate the effect of the intermodulation products.

Note that it is also possible that neither $f_1$ nor $f_2$ is an intended transmission, but are themselves unwanted byproducts, such as a carrier leakage, an IQ image, or an intermodulation product created by a preceding component in the transmit chain. The location of these byproducts in a frequency may be predictable, in which case the same method of zeroing the LLRs or assigning resources can be applied.

Since there may be a large number of transmitted (uplink) subcarriers, calculating the locations of all relevant intermodulation products can be burdensome. Interference management unit 412 and/or interference management unit 422 can simplify such calculation by considering continuous occupied frequency intervals. For example, assume that the transmitted (uplink) subcarriers are confined in two distinct intervals $[f_{1,Low} \ldots f_{1,High}]$ and $[f_{2,Low} \ldots f_{2,High}]$ also assume that $f_{1,High} > f_{2,Low}$. In this example, third order intermodulation products will be located, for example, at [2 $f_{1,Low} - f_{2,High} \ldots 2 f_{1,High} - f_{2,Low}$] and [2 $f_{2,Low} - f_{1,High} \ldots 2 f_{2,High} - f_{1,Low}$] and also at [2 $f_{1,Low} + f_{2,Low} \ldots 2 f_{1,High} + f_{2,High}$] and [2 $f_{2,Low} + f_{1,Low} \ldots 2 f_{2,High} + f_{1,High}$]. This approach is also applicable when at least one of the transmitted waveforms is not orthogonal frequency-division multiplexing (OFDM), or is not composed of a set of distinct carriers, but rather includes a continuum of frequencies (e.g., in the case of CDMA, or analog signals).

Additionally or alternatively, the interference management unit 412 and/or interference management unit 422 can select a set of uplink carriers such that associated intermodulation products do not overlap with a received signal. For example, if when both WiFi and LTE-A are utilized, a WiFi uplink carrier may be selected so that the intermodulation products or harmonics do not overlap with a downlink LTE-A carrier.

It should also be noted that estimating intermodulation products can be performed by a base station and/or mobile device within a communication system. In one example, a base station may make downlink and uplink assignments to a mobile device, and based on the uplink data transmission, the base station can schedule a downlink assignment so as to avoid the subcarriers associated with the intermodulation products. Different mobile devices can be assigned to different uplink and downlink subcarriers so that intermodulation products may be avoided for each mobile device, while making use of the entire uplink and downlink bandwidth. In another example, the mobile device may indicate to the base station the locations where the intermodulation products or harmonics may be expected (e.g. depending on the technologies it is using).

Figure 5:
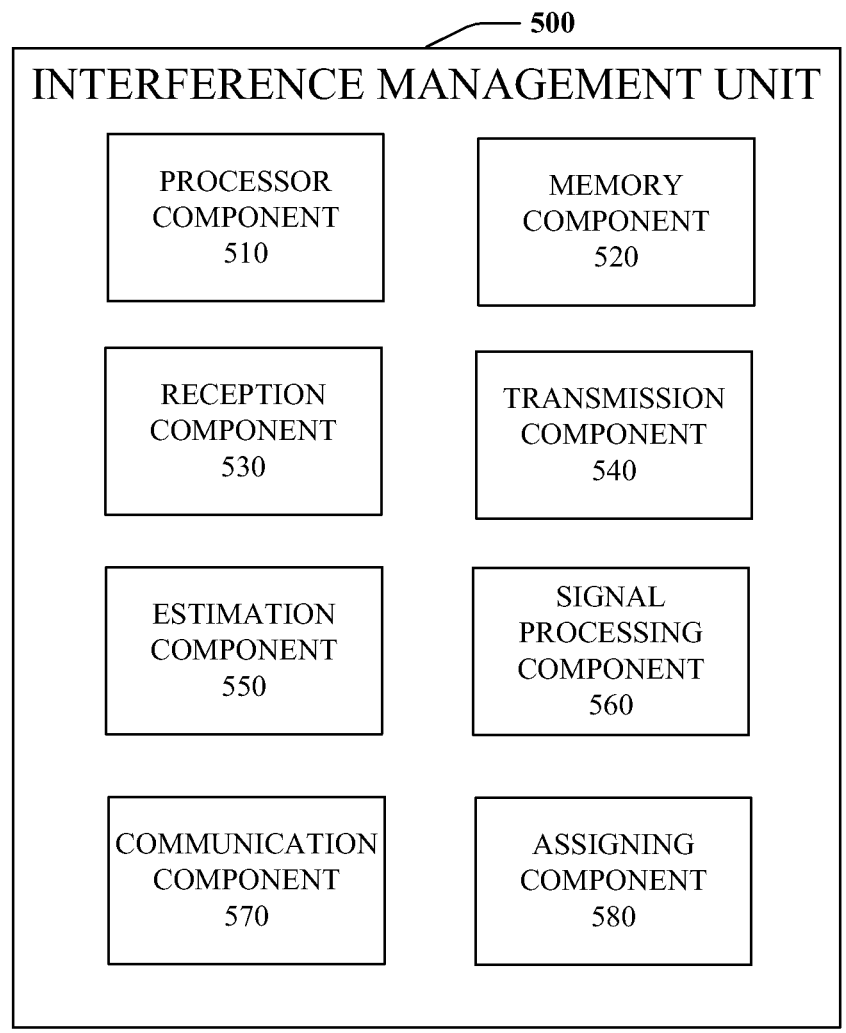
FIG. 5 is a block diagram of an exemplary interference management unit.

Referring next to FIG. 5, an exemplary interference management unit that facilitates interference reduction is illustrated. As shown, interference management unit 500 may include processor component 510, memory component 520, reception component 530, transmission component 540, estimation component 550, signal processing component 560, communication component 570, and assigning component 580.

In one aspect, processor component 510 is configured to execute computer-readable instructions related to performing any of a plurality of functions. Processor component 510 can be a single processor or a plurality of processors which analyze information to be communicated from interference management unit 500 and/or generate information that is utilized by memory component 520, reception component 530, transmission component 540, estimation component 550, signal processing component 560, communication component 570, and/or assigning component 580. Additionally or alternatively, processor component 510 may be configured to control one or more components of interference management unit 500.

In another aspect, memory component 520 is coupled to processor component 510 and configured to store computer-readable instructions executed by processor component 510. Memory component 520 may also be configured to store any of a plurality of other types of data including generated by any of reception component 530, transmission component 540, estimation component 550, signal processing component 560, communication component 570, and/or assigning component 580. Memory component 520 can be configured in a number of different configurations, including as random access memory, battery-backed memory, hard disk, magnetic tape, etc. Various features can also be implemented upon memory component 520, such as compression and automatic back up (e.g., use of a Redundant Array of Independent Drives configuration).

In a first exemplary embodiment, interference management unit 500 may be configured to compensate signal transmissions associated with intermodulation products which interfere with received signals. Within such embodiment, reception component 530 may be configured to determine at least one subcarrier on a first frequency, whereas transmission component 540 may be configured to identify at least two subcarriers on a second frequency. For this embodiment, a signal reception is facilitated by the at least one subcarrier, whereas a signal transmission is facilitated by the at least two subcarriers. In an aspect, the signal reception is facilitated by a first air interface technology, whereas the signal transmission is facilitated by a second air interface technology different than the first air interface technology. It is also, however, contemplated that the signal reception and the signal transmission are facilitated by a common air interface technology.

In a further aspect, signal transmissions may be facilitated by either a set of distinct carriers and/or a continuum of frequencies. For instance, with respect to transmissions via a set of distinct carriers, the signal transmission may be an orthogonal frequency-division multiplexing (OFDM) transmission. On the other hand, for transmissions via a continuum of frequencies, the signal transmission may be a code division multiple access (CDMA) transmission or an analog transmission, for example.

As illustrated, interference management unit 500 may also include estimation component 550 and signal processing component 560. Estimation component 550 may be configured to determine an estimated interference to at least one subcarrier associated with at least one of an intermodulation product, whereas signal processing component 560 can be configured to process the at least one subcarrier based on the estimated interference. Here, it should be noted that signal processing component 560 may be configured to utilize the estimated interference to process the at least one sub-carrier in any of a plurality of ways. For instance, signal processing component 560 may be configured to demodulate the at least one subcarrier, as well as to decode the at least one subcarrier. However, signal processing component 560 may also be configured to reset a set of log-likelihood ratio metrics associated with the at least one subcarrier. For example, signal processing component 560 may be configured to set the set of log-likelihood ratio metrics to zero.

Interference management unit 500 may be configured to avoid transmitting signals via subcarriers which reduce interference to received signals from intermodulation products. In one aspect, reception component 530 may be configured to determine at least one subcarrier on a first frequency, whereas transmission component 540 can be configured to perform a selection of at least two subcarriers on a second frequency. The transmission component 540 can perform the selection so as to avoid an overlap between the at least one subcarrier and at least one of an intermodulation product or a harmonic product associated with the at least two subcarriers. Communication component 570 can be configured to transmit on the at least two subcarriers via an uplink communication in the case of user equipment 410 or via a downlink communication in the case of network entity 420. For instance, communication component 570 may be configured to provide an uplink communication via the at least two subcarriers, wherein the signal reception facilitated by reception component 530 is associated with a downlink. Within such embodiment, transmission component 540 may be configured to select the at least two subcarriers based on an assignment provided by a network. Alternatively, communication component 570 may be configured to provide a downlink communication via the at least two subcarriers, wherein the signal reception facilitated by reception component 530 is associated with an uplink.

In a particular embodiment, interference management unit 500 resides within user equipment (e.g., user equipment 410). In one aspect, estimation component 550 may be configured to determine an estimated interference associated with a data transmission over a plurality of subcarriers on an uplink, whereas signal processing component 560 may be configured to process data received over at least one subcarrier on a downlink based at least in part on the estimated interference. Here, it should be noted that estimation component 550 may be configured to ascertain the estimated interference in any of a plurality of ways. For instance, estimation component 550 may be configured to determine a set of intermodulation products associated with the plurality of subcarriers. Indeed, within such embodiment, estimation component 550 may be further configured to identify the at least one subcarrier as having a frequency within a range of frequencies related to the set of intermodulation products associated with the plurality of subcarriers. For this embodiment, signal processing component 560 may be configured to zero a log-likelihood ratio (LLR) for modulation symbols of the at least one subcarrier.

When implementing interference management unit 500 within user equipment (e.g., user equipment 410), it should also be noted that communication component 570 may include any of multiple further configurations as well. For instance, communication component 570 may be configured to suspend the data transmission on at least one of the plurality of subcarriers based at least in part on the estimated interference. For this particular embodiment, communication component 570 may be further configured to suspend the data transmission in response to a scheduling from a base station (e.g., network entity 420). In another embodiment, communication component 570 may be configured to transmit a set of information relating to the estimated interference to a base station (e.g., network entity 420), wherein the set of information may, for example, comprise frequency locations of intermodulation products associated with the plurality of subcarriers.

Various other aspects directed towards implementing interference management unit 500 within user equipment (e.g., user equipment 410) are also contemplated. For instance, transmission component 540 may be configured to select a subcarrier for transmitting data on the uplink based at least in part on the estimated interference. Also, with respect to particular subcarrier characteristics, it should be noted that the plurality of subcarriers may comprise a plurality of discontiguous subcarriers available for a parallel data transmission on the uplink. It is also contemplated that the plurality of subcarriers may comprise a first set of subcarriers associated with a first wireless access technology and second set of subcarriers associated with a second wireless access technology. For example, the first wireless access technology may comprise a long term evolution system, whereas the second wireless access technology may comprise a code division multiple access (CDMA) system or a wireless fidelity (WiFi) system. In another embodiment, interference management unit 500 resides within a network entity (e.g., network entity 420). In one aspect, estimation component 550 may be configured to ascertain an estimated interference associated with a data transmission by a wireless device over a plurality of subcarriers, whereas assigning component 580 may be configured to assign resources to the wireless device based at least in part on the estimated interference. Here, it should be noted that either of estimation component 550 or assigning component 580 may have any of multiple further configurations. For instance, estimation component 550 may be further configured to determine a set of intermodulation products associated with the plurality of subcarriers, and assigning component 580 may be further configured to schedule the wireless device on either an uplink subcarrier or a downlink subcarrier.

When implementing interference management unit 500 within a network entity (e.g., network entity 420), it should also be noted that communication component 570 may include any of multiple further configurations as well. For instance, communication component 570 may be configured to receive an indication from the wireless device relating to frequency locations of intermodulation products associated with the plurality of subcarriers, wherein estimation component 550 may be configured to ascertain the estimated interference based at least in part on the indication received from the wireless device. For this particular embodiment, the frequency locations of intermodulation products associated with the plurality of subcarriers may be related to data transmissions of the wireless device over at least a first wireless access technology and a second wireless access technology. For instance, the first wireless access technology may comprise a long term evolution system, whereas the second wireless access technology may be a code division multiple access (CDMA) system or a wireless fidelity (WiFi) system.

Figure 6:
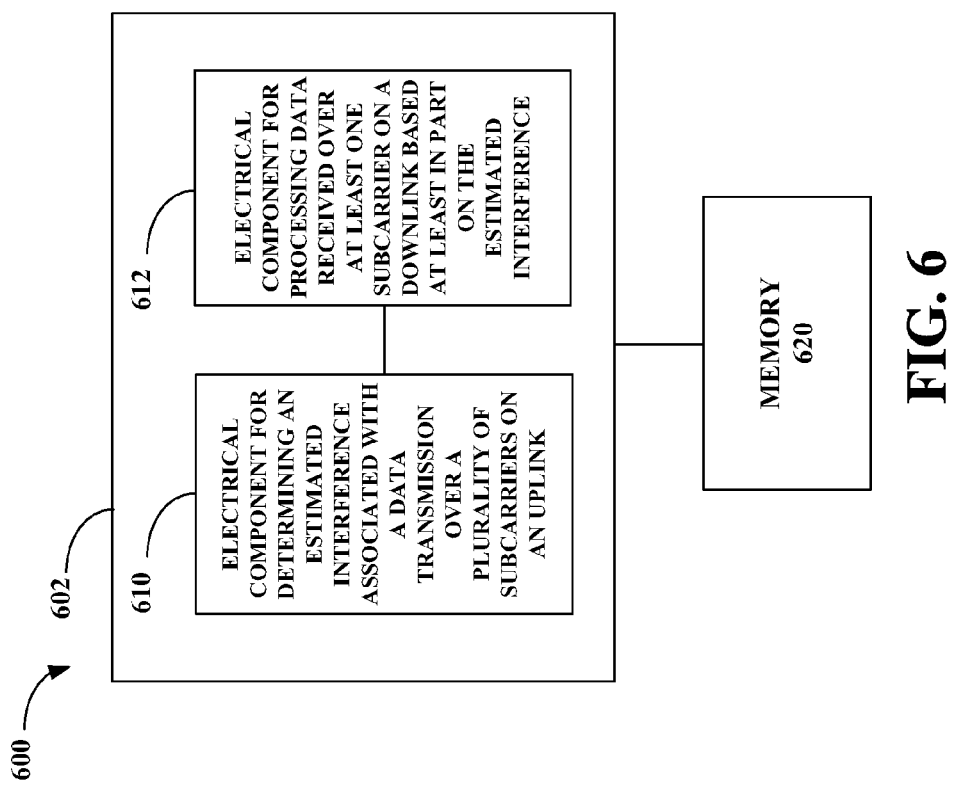
FIG. 6 shows a first exemplary coupling of electrical components that effectuate interference reduction in a wireless communication system.

Turning to FIG. 6, illustrated is a system 600 that facilitates an interference reduction according to an embodiment. System 600 and/or instructions for implementing system 600 can reside within user equipment (e.g., user equipment 410). As depicted, system 600 includes functional blocks that can represent functions implemented by a processor using instructions and/or data from a computer readable storage medium. System 600 includes a logical grouping 602 of electrical components that can act in conjunction. As illustrated, logical grouping 602 can include an electrical component for estimating an estimated interference associated with a data transmission over a plurality of subcarriers on an uplink 610. Logical grouping 602 can also include an electrical component for processing data received over at least one subcarrier on a downlink based at least in part on the estimated interference 612. Additionally, system 600 can include a memory 620 that retains instructions and/or data for executing functions associated with electrical components 610 and 612. While shown as being external to memory 620, it is to be understood that electrical components 610 and 612 can exist within memory 620.

Figure 7:
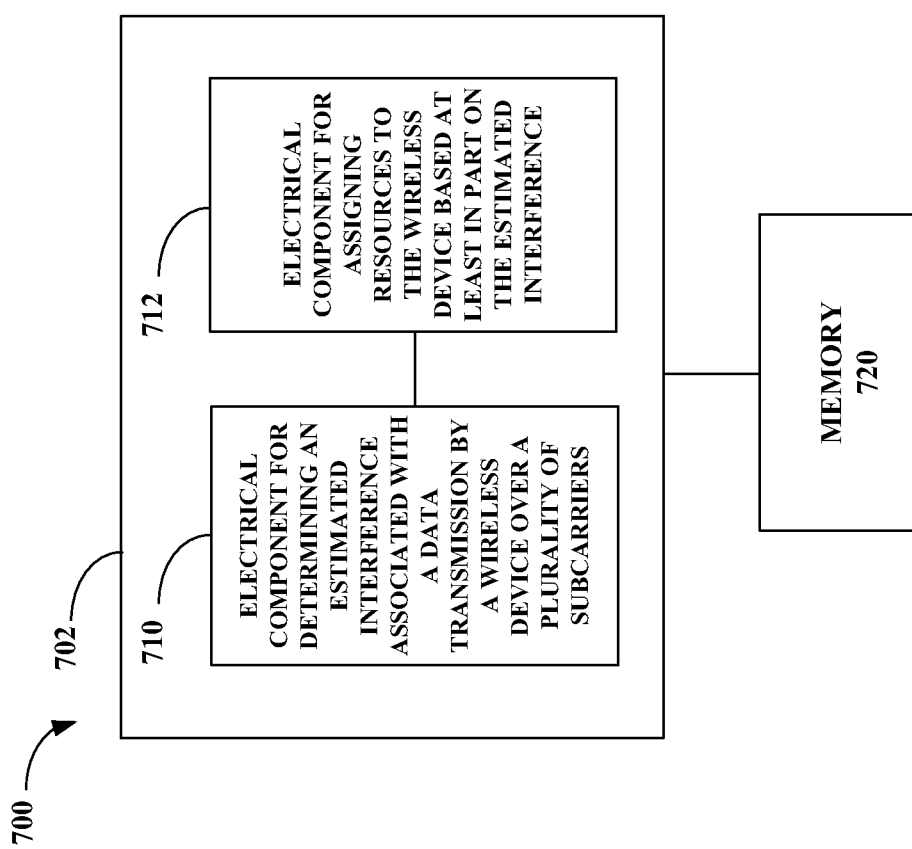
FIG. 7 shows a second exemplary coupling of electrical components that effectuate interference reduction in a wireless communication system.

Referring next to FIG. 7, illustrated is another exemplary system 700 that facilitates interference reduction. System 700 and/or instructions for implementing system 700 can physically reside within a network entity (e.g., network entity 420), for instance, wherein system 700 includes functional blocks that can represent functions implemented by a processor using instructions and/or data from a computer readable storage medium. System 700 includes a logical grouping 702 of electrical components that can act in conjunction similar to logical grouping 602 in system 600. As illustrated, logical grouping 702 can include an electrical component for estimating an estimated interference associated with a data transmission by a wireless device over a plurality of subcarriers 710. Logical grouping 702 can also include an electrical component for assigning resources to the wireless device based at least in part on the estimated interference 712. Additionally, system 700 can include a memory 720 that retains instructions and/or data for executing functions associated with electrical components 710 and 712. While shown as being external to memory 720, it is to be understood that electrical components 710 and 712 can exist within memory 720.

Figure 8:
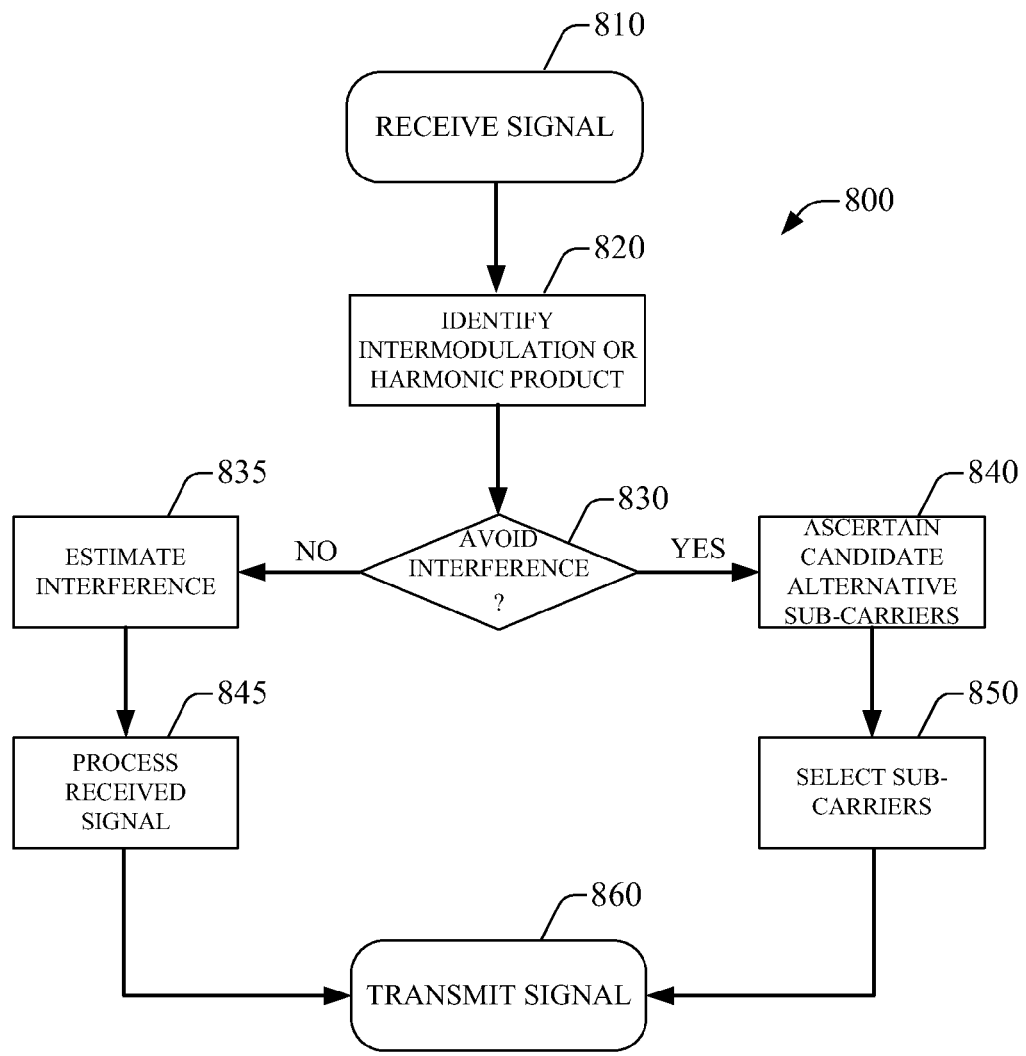
FIG. 8 shows an example methodology for reducing interference.

Referring next to FIG. 8, an example process is shown for facilitating an interference reduction in wireless communications. As illustrated, process 800 includes a series of operations that may be performed by a wireless terminal or network entity. For instance, process 800 may be implemented by employing a processor to execute computer executable instructions stored on a computer readable storage medium to implement the series of operations.

In an aspect, process 800 begins with a signal being received at 810. At 820, intermodulation or harmonic products within the received signal are identified. Once the intermodulation or harmonic products have been identified, process 800 determines, at 830, whether intermodulation or harmonic products may cause interference that should be avoided in a subsequent signal transmission.

If the interference is to be avoided, processing proceeds to 840 where candidate alternative sub-carriers for transmission are ascertained. In one aspect, sub-carriers which do not overlap with the intermodulation or harmonic products of the received signal are identified. Once the candidate sub-carriers are identified, particular sub-carriers are selected for transmission at 850. At 860, a signal is transmitted using the selected sub-carriers.

However, if it is determined at 830 that the interference is not to be avoided by selection of sub-carriers, processing proceeds to 835 where the interference caused by the intermodulation or harmonic products is estimated. The received signal is then processed at 845 based at least in part on the estimated interference and at 860 a signal is transmitted. Here, it should be noted that such processing may, for example, include demodulating and/or decoding the received signal according to the estimated interference. The processing may also include resetting a set of log-likelihood ratio metrics associated with the received signal, wherein the resetting comprises setting the set of log-likelihood ratio metrics to zero.

Figure 9:
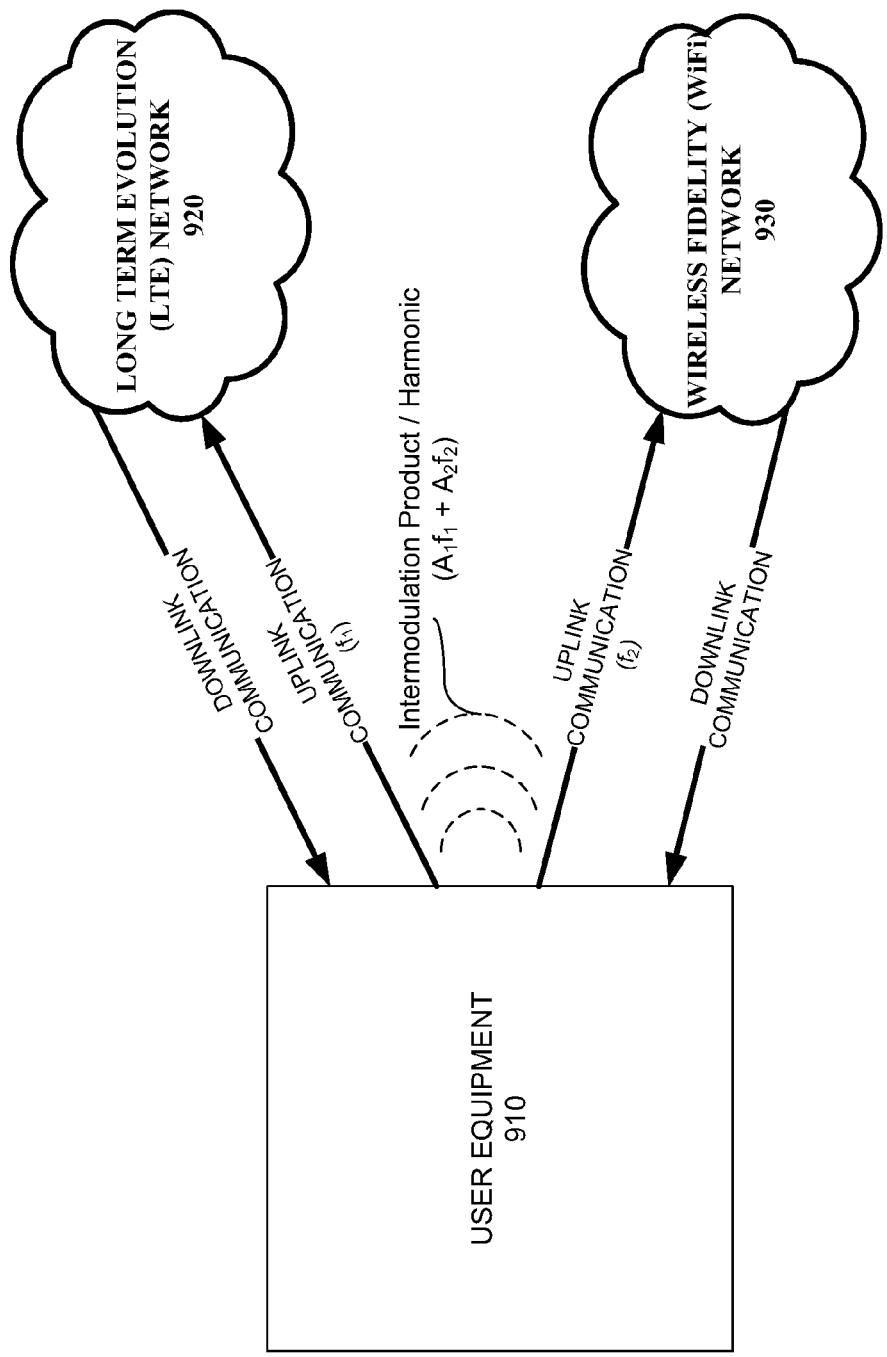
FIG. 9 illustrates an exemplary communication system having multiple wireless access technologies.

In a particular aspect, it should be noted that intermodulation products and/or harmonics may result from multicarrier communications involving different types of wireless networks. In FIG. 9, an exemplary system is illustrated in which user equipment 910 transmits uplink communications to each of long term evolution (LTE) network 920 and Wi-Fi network 930. For this particular example, the uplink communication transmitted to long term evolution (LTE) network 920 is transmitted via a first frequency $f_1$, whereas the uplink communication transmitted to WiFi network 930 is transmitted via a second frequency $f_2$. As illustrated, such uplink transmissions may create intermodulation products and/or harmonics $A_1 f_1 + A_2 f_2$, which may interfere with downlink communications received from either of long term evolution (LTE) network 920 or wireless fidelity (WiFi) network 930.

Exemplary Communication System

Figure 10:
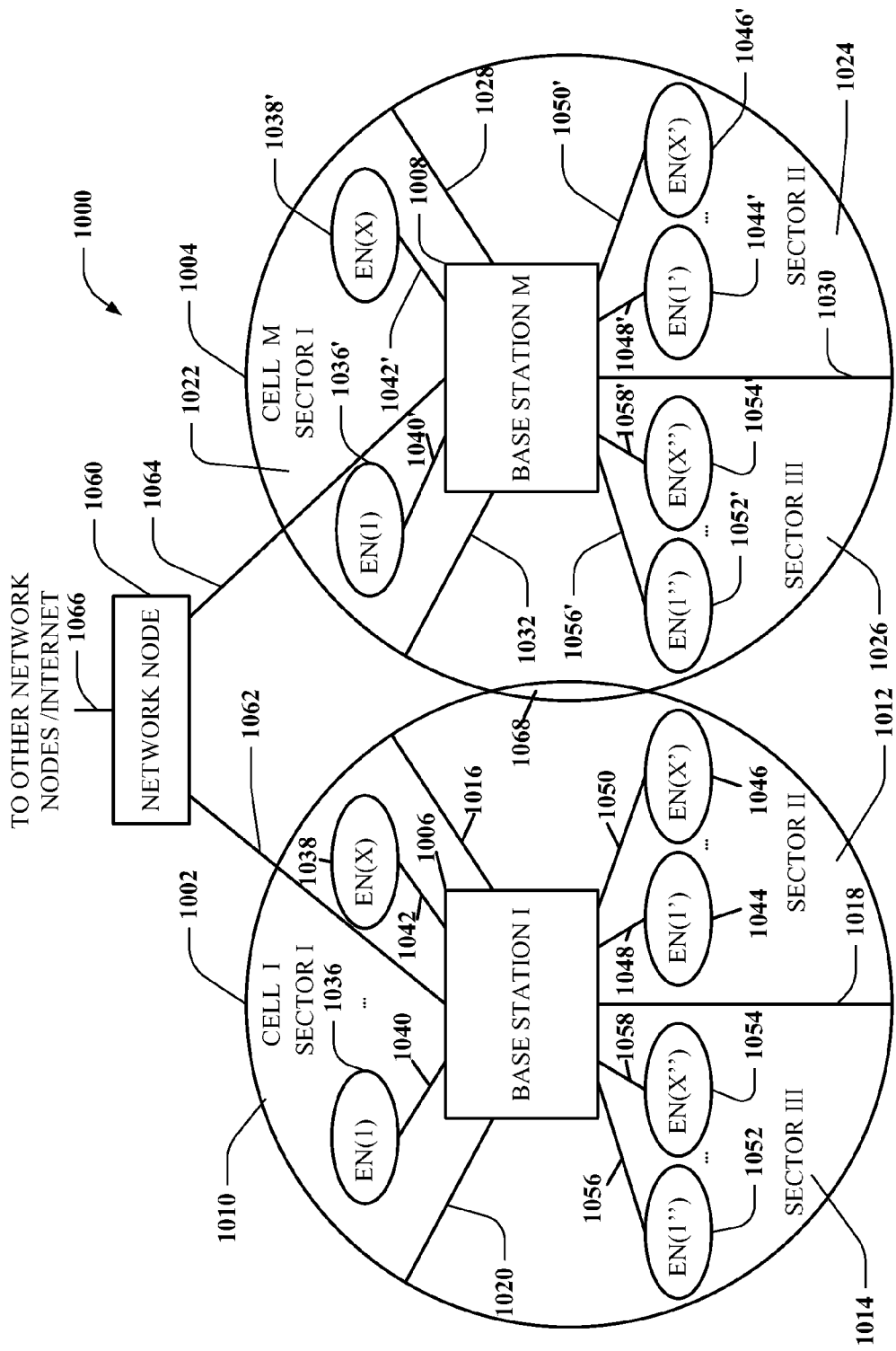
FIG. 10 shows an exemplary communication system having multiple cells.

Referring next to FIG. 10, an exemplary communication system 1000 having multiple cells (e.g., cell 1002, cell 1004) is illustrated. Here, it should be noted that neighboring cells 1002, 1004 overlap slightly, as indicated by cell boundary region 1068, thereby creating potential for signal interference between signals transmitted by base stations in neighboring cells. Each cell 1002, 1004 of system 1000 includes three sectors. Cells which have not been subdivided into multiple sectors (N=1), cells with two sectors (N=2) and cells with more than 3 sectors (N>3) can also be utilized. Cell 1002 includes a first sector, sector I 1010, a second sector, sector II 1012, and a third sector, sector III 1014. Each sector 1010, 1012, and 1014 has two sector boundary regions; each boundary region is shared between two adjacent sectors.

Interference between signals transmitted by base stations in neighboring sectors can occur in boundary regions. Line 1016 represents a sector boundary region between sector I 1010 and sector II 1012; line 1018 represents a sector boundary region between sector II 1012 and sector III 1014; line 1020 represents a sector boundary region between sector III 1014 and sector I 1010. Similarly, cell M 1004 includes a first sector, sector I 1022, a second sector, sector II 1024, and a third sector, sector III 1026. Line 1028 represents a sector boundary region between sector I 1022 and sector II 1024; line 1030 represents a sector boundary region between sector II 1024 and sector III 1026; line 1032 represents a boundary region between sector III 1026 and sector I 1022. Cell I 1002 includes a base station (BS), base station I 1006, and a plurality of end nodes (ENs) in each sector 1010, 1012, 1014. Sector I 1010 includes EN(1) 1036 and EN(X) 1038 coupled to BS 1006 via wireless links 1040, 1042, respectively; sector II 1012 includes EN(1') 1044 and EN(X') 1046 coupled to BS 1006 via wireless links 1048, 1050, respectively; sector III 1014 includes EN(1") 1052 and EN(X") 1054 coupled to BS 1006 via wireless links 1056, 1058, respectively. Similarly, cell M 1004 includes base station M 1008, and a plurality of end nodes (ENs) in each sector 1022, 1024, and 1026. Sector I 1022 includes EN(1) 1036' and EN(X) 1038' coupled to BS M 1008 via wireless links 1040', 1042', respectively; sector II 1024 includes EN(1') 1044' and EN(X') 1046' coupled to BS M 1008 via wireless links 1048', 1050', respectively; sector III 1026 includes EN(1") 1052' and EN(X") 1054' coupled to BS 1008 via wireless links 1056', 1058', respectively.

System 1000 also includes a network node 1060 which is coupled to BS I 1006 and BS M 1008 via network links 1062, 1064, respectively. Network node 1060 is also coupled to other network nodes, e.g., other base stations, AAA server nodes, intermediate nodes, routers, etc. and the Internet via network link 1066. Network links 1062, 1064, 1066 may be, e.g., fiber optic cables. Each end node, e.g. EN 1 1036 may be a wireless terminal including a transmitter as well as a receiver. The wireless terminals, e.g., EN(1) 1036 may move through system 1000 and may communicate via wireless links with the base station in the cell in which the EN is currently located. The wireless terminals, (WTs), e.g. EN(1) 1036, may communicate with peer nodes, e.g., other WTs in system 1000 or outside system 1000 via a base station, e.g. BS 1006, and/or network node 1060. WTs, e.g., EN(1) 1036 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 11:
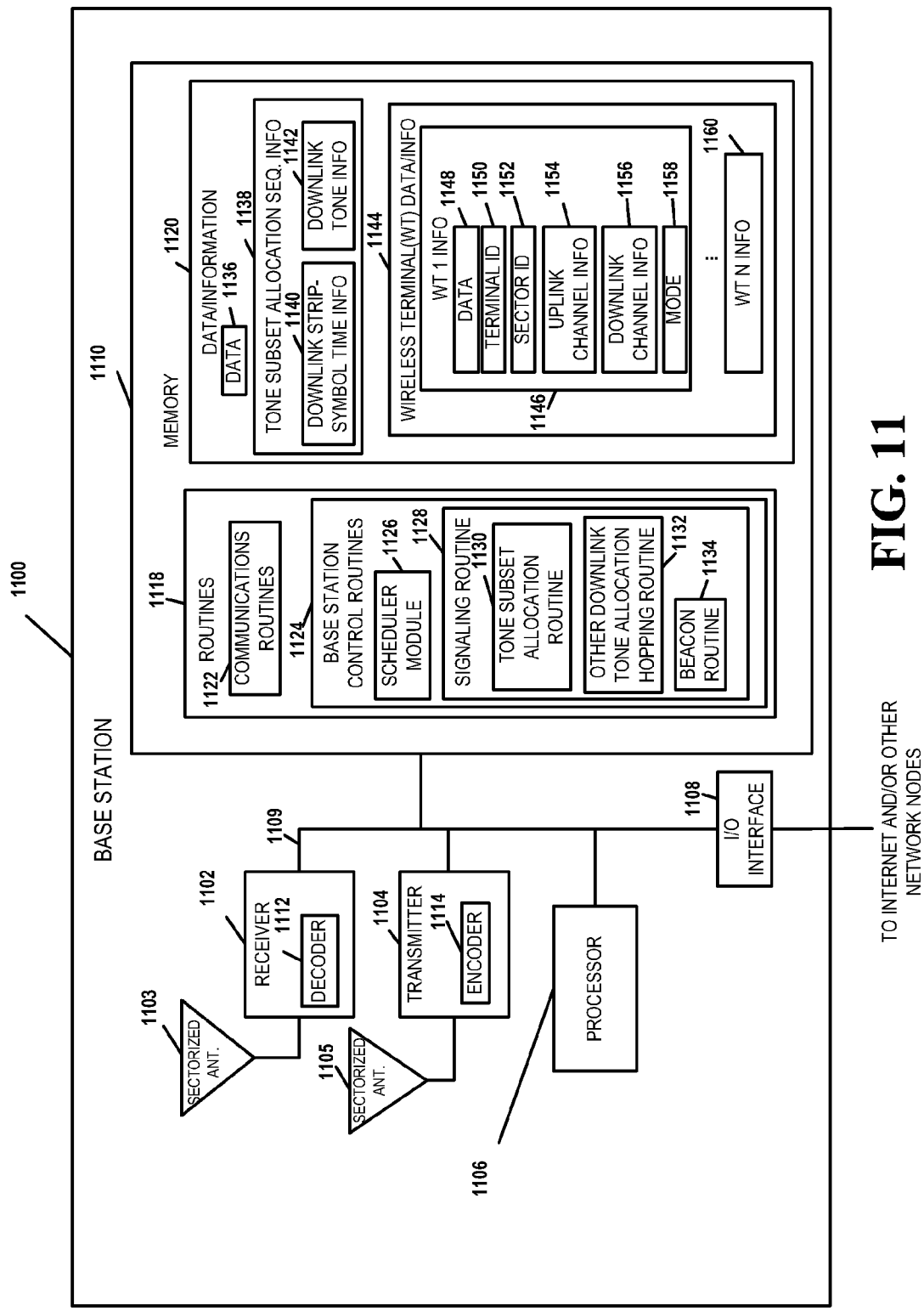
FIG. 11 is a block diagram of an exemplary base station.

FIG. 11 illustrates an example base station 1100. Base station 1100 implements tone subset allocation sequences, with different tone subset allocation sequences generated for respective different sector types of the cell. Base station 1100 may be used as any one of base stations 1006, 1008 of the system 1000 of FIG. 10. The base station 1100 includes a receiver 1102, a transmitter 1104, a processor 1106, e.g., CPU, an input/output interface 1108 and memory 1110 coupled together by a bus 1109 over which various elements 1102, 1104, 1106, 1108, and 1110 may interchange data and information.

Sectorized antenna 1103 coupled to receiver 1102 is used for receiving data and other signals, e.g., channel reports, from wireless terminals transmissions from each sector within the base station's cell. Sectorized antenna 1105 coupled to transmitter 1104 is used for transmitting data and other signals, e.g., control signals, pilot signal, beacon signals, etc. to wireless terminals 1200 (see FIG. 12) within each sector of the base station's cell. In various aspects, base station 1100 may employ multiple receivers 1102 and multiple transmitters 1104, e.g., an individual receivers 1102 for each sector and an individual transmitter 1104 for each sector. Processor 1106, may be, e.g., a general purpose central processing unit (CPU). Processor 1106 controls operation of base station 1100 under direction of one or more routines 1118 stored in memory 1110 and implements the methods. I/O interface 1108 provides a connection to other network nodes, coupling the BS 1100 to other base stations, access routers, AAA server nodes, etc., other networks, and the Internet. Memory 1110 includes routines 1118 and data/information 1120.

Data/ information 1120 includes data 1136, tone subset allocation sequence information 1138 including downlink strip-symbol time information 1140 and downlink tone information 1142, and wireless terminal (WT) data/info 1144 including a plurality of sets of WT information: WT 1 info 1146 and WT N info 1160. Each set of WT info, e.g., WT 1 info 1146 includes data 1148, terminal ID 1150, sector ID 1152, uplink channel information 1154, downlink channel information 1156, and mode information 1158.

Routines 1118 include communications routines 1122 and base station control routines 1124. Base station control routines 1124 includes a scheduler module 1126 and signaling routines 1128 including a tone subset allocation routine 1130 for strip-symbol periods, other downlink tone allocation hopping routine 1132 for the rest of symbol periods, e.g., non strip-symbol periods, and a beacon routine 1134.

Data 1136 includes data to be transmitted that will be sent to encoder 1114 of transmitter 1104 for encoding prior to transmission to WTs, and received data from WTs that has been processed through decoder 1112 of receiver 1102 following reception. Downlink strip-symbol time information 1140 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1142 includes information including a carrier frequency assigned to the base station 1100, the number and frequency of tones, and the set of tone subsets to be allocated to the strip-symbol periods, and other cell and sector specific values such as slope, slope index and sector type.

Data 1148 may include data that WT1 1200 has received from a peer node, data that WT 1 1200 desires to be transmitted to a peer node, and downlink channel quality report feedback information. Terminal ID 1150 is a base station 1100 assigned ID that identifies WT 1 1200. Sector ID 1152 includes information identifying the sector in which WT1 1200 is operating. Sector ID 1152 can be used, for example, to determine the sector type. Uplink channel information 1154 includes information identifying channel segments that have been allocated by scheduler 1126 for WT1 1200 to use, e.g., uplink traffic channel segments for data, dedicated uplink control channels for requests, power control, timing control, etc. Each uplink channel assigned to WT1 1200 includes one or more logical tones, each logical tone following an uplink hopping sequence. Downlink channel information 1156 includes information identifying channel segments that have been allocated by scheduler 1126 to carry data and/or information to WT1 1200, e.g., downlink traffic channel segments for user data. Each downlink channel assigned to WT1 1200 includes one or more logical tones, each following a downlink hopping sequence. Mode information 1158 includes information identifying the state of operation of WT1 1200, e.g. sleep, hold, on.

Communications routines 1122 are utilized by base station 1100 to perform various communications operations and implement various communications protocols. Base station control routines 1124 are used to control the base station 1100 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1128 controls the operation of receiver 1102 with its decoder 1112 and transmitter 1104 with its encoder 1114. The signaling routine 1128 is responsible controlling the generation of transmitted data 1136 and control information. Tone subset allocation routine 1130 constructs the tone subset to be used in a strip-symbol period using the method of the aspect and using data/info 1120 including downlink strip-symbol time info 1140 and sector ID 1152. The downlink tone subset allocation sequences will be different for each sector type in a cell and different for adjacent cells. The WTs 1200 receive the signals in the strip-symbol periods in accordance with the downlink tone subset allocation sequences; the base station 1100 uses the same downlink tone subset allocation sequences in order to generate the transmitted signals. Other downlink tone allocation hopping routine 1132 constructs downlink tone hopping sequences, using information including downlink tone information 1142, and downlink channel information 1156, for the symbol periods other than the strip-symbol periods. The downlink data tone hopping sequences are synchronized across the sectors of a cell. Beacon routine 1134 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 12:
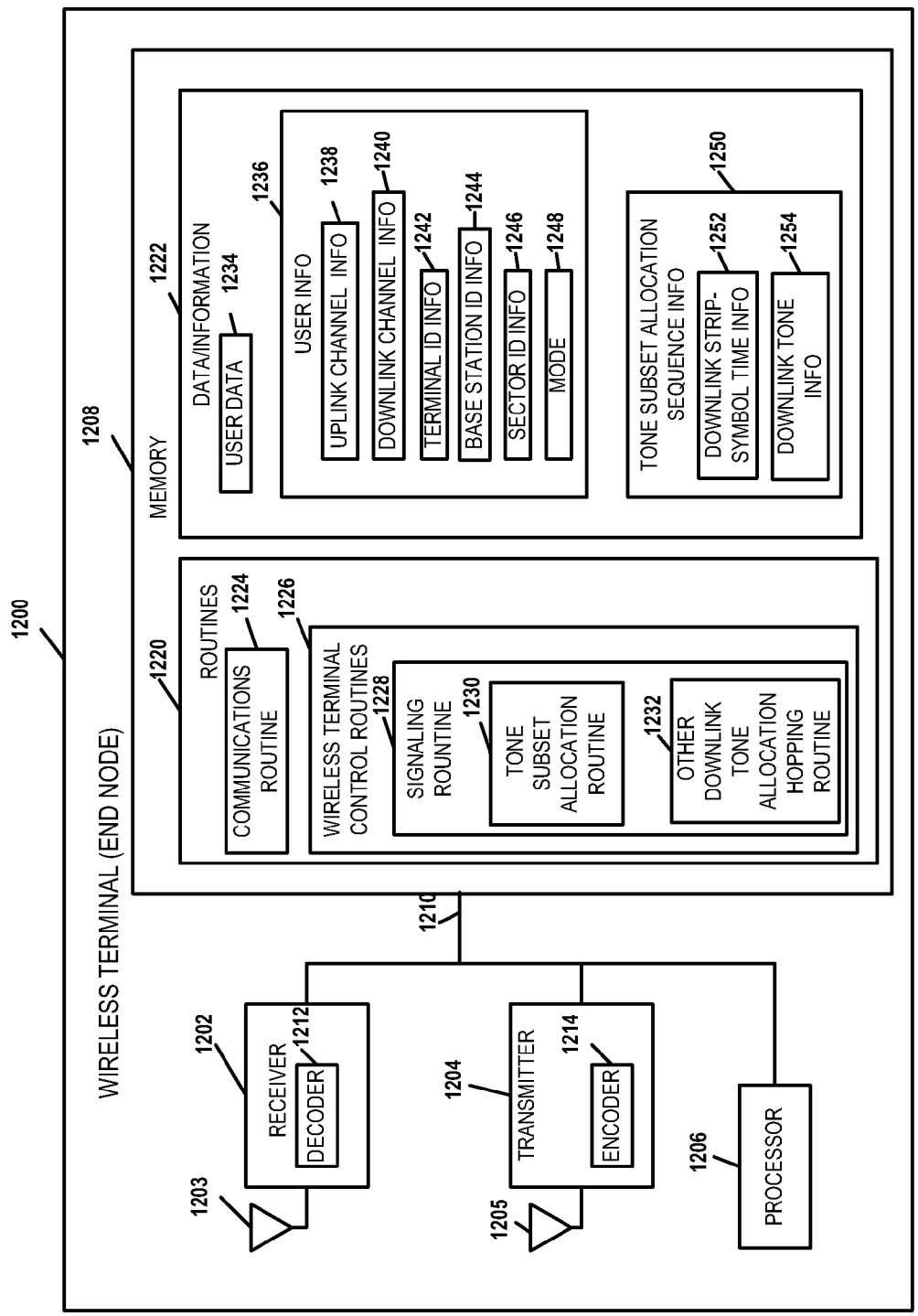
FIG. 12 is a block diagram of an exemplary wireless terminal

FIG. 12 illustrates an example wireless terminal (end node) 1200 which can be used as any one of the wireless terminals (end nodes), e.g., EN(1) 1036, of the system 1000 shown in FIG. 10. Wireless terminal 1200 implements the tone subset allocation sequences. The wireless terminal 1200 includes a receiver 1202 including a decoder 1212, a transmitter 1204 including an encoder 1214, a processor 1206, and memory 1208 which are coupled together by a bus 1210 over which the various elements 1202, 1204, 1206, 1208 can interchange data and information. An antenna 1203 used for receiving signals from a base station (and/or a disparate wireless terminal) is coupled to receiver 1202. An antenna 1205 used for transmitting signals, e.g., to a base station (and/or a disparate wireless terminal) is coupled to transmitter 1204.

The processor 1206, e.g., a CPU controls the operation of the wireless terminal 1200 and implements methods by executing routines 1220 and using data/information 1222 in memory 1208.

Data/information 1222 includes user data 1234, user information 1236, and tone subset allocation sequence information 1250. User data 1234 may include data, intended for a peer node, which will be routed to encoder 1214 for encoding prior to transmission by transmitter 1204 to a base station, and data received from the base station which has been processed by the decoder 1212 in receiver 1202. User information 1236 includes uplink channel information 1238, downlink channel information 1240, terminal ID information 1242, base station ID information 1244, sector ID information 1246, and mode information 1248. Uplink channel information 1238 includes information identifying uplink channels segments that have been assigned by a base station for wireless terminal 1200 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1240 includes information identifying downlink channel segments that have been assigned by a base station to WT 1200 for use when the base station is transmitting data/information to WT 1200. Downlink channels may include downlink traffic channels and assignment channels, each downlink channel including one or more logical tone, each logical tone following a downlink hopping sequence, which is synchronized between each sector of the cell.

User info 1236 also includes terminal ID information 1242, which is a base station-assigned identification, base station ID information 1244 which identifies the specific base station that WT has established communications with, and sector ID info 1246 which identifies the specific sector of the cell where WT 1200 is presently located. Base station ID 1244 provides a cell slope value and sector ID info 1246 provides a sector index type; the cell slope value and sector index type may be used to derive tone hopping sequences. Mode information 1248 also included in user info 1236 identifies whether the WT 1200 is in sleep mode, hold mode, or on mode.

Tone subset allocation sequence information 1250 includes downlink strip-symbol time information 1252 and downlink tone information 1254. Downlink strip-symbol time information 1252 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1254 includes information including a carrier frequency assigned to the base station, the number and frequency of tones, and the set of tone subsets to be allocated to the strip-symbol periods, and other cell and sector specific values such as slope, slope index and sector type.

Routines 1220 include communications routines 1224 and wireless terminal control routines 1226. Communications routines 1224 control the various communications protocols used by WT 1200. Wireless terminal control routines 1226 controls basic wireless terminal 1200 functionality including the control of the receiver 1202 and transmitter 1204. Wireless terminal control routines 1226 include the signaling routine 1228. The signaling routine 1228 includes a tone subset allocation routine 1230 for the strip-symbol periods and an other downlink tone allocation hopping routine 1232 for the rest of symbol periods, e.g., non strip-symbol periods. Tone subset allocation routine 1230 uses user data/info 1222 including downlink channel information 1240, base station ID info 1244, e.g., slope index and sector type, and downlink tone information 1254 in order to generate the downlink tone subset allocation sequences in accordance with some aspects and process received data transmitted from the base station. Other downlink tone allocation hopping routine 1232 constructs downlink tone hopping sequences, using information including downlink tone information 1254, and downlink channel information 1240, for the symbol periods other than the strip-symbol periods. Tone subset allocation routine 1230, when executed by processor 1206, is used to determine when and on which tones the wireless terminal 1200 is to receive one or more strip-symbol signals from the base station 1100. The uplink tone allocation hopping routine 1232 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method of wireless communication, comprising:
   determining an estimated interference associated with a data transmission over a plurality of subcarriers on an uplink;
   transmitting a set of information relating to the estimated interference to a base station, wherein the set of information comprises frequency locations of intermodulation products associated with the plurality of subcarriers; and
   processing data received over at least one subcarrier on a downlink based at least in part on the estimated interference, wherein processing data received over the at least one subcarrier comprises zeroing a log-likelihood ratio (LLR) for modulation symbols of the at least one subcarrier.

2. The method of claim 1, wherein determining the estimated interference comprises determining intermodulation products associated with the plurality of subcarriers.

3. The method of claim 2 wherein determining the estimated interference comprises identifying the at least one subcarrier as having a frequency within a range of frequencies related to the intermodulation products.

4. The method of claim 1, further comprising suspending the data transmission on at least one of the plurality of subcarriers based at least in part on the estimated interference.

5. The method of claim 4, wherein suspending the data transmission is responsive to a scheduling from a base station.

6. The method of claim 1, further comprising selecting a subcarrier for transmitting data on the uplink based at least in part on the estimated interference.

7. The method of claim 1, wherein the plurality of subcarriers comprise a first set of subcarriers associated with a first wireless access technology and second set of subcarriers associated with a second wireless access technology.

8. The method of claim 7, wherein the first wireless access technology comprises a long term evolution (LTE) system and the second wireless access technology is one of a code division multiple access (CDMA) system or a WiFi system.

9. The method of claim 1, wherein the plurality of subcarriers comprise a plurality of discontiguous subcarriers available for a parallel data transmission on the uplink.

10. An wireless communications apparatus, comprising:
    a processor configured to execute computer executable components stored in a memory, including:
      an estimation component configured to determine an estimated interference associated with a data transmission over a plurality of subcarriers on an uplink;
      a communication component configured to transmit a set of information relating to the estimated interference to a base station, wherein the set of information comprises frequency locations of intermodulation products associated with the plurality of subcarriers; and
      a signal processing component configured to process data received over at least one subcarrier on a downlink based at least in part on the estimated interference and configured to zero a log-likelihood ratio (LLR) for modulation symbols of the at least one subcarrier.

11. The apparatus of claim 10, wherein the estimation component is configured to determine intermodulation products associated with the plurality of subcarriers.

12. The apparatus of claim 11, wherein the estimation component is configured to identify the at least one subcarrier as having a frequency within a range of frequencies related to intermodulation products.

13. The apparatus of claim 10, further comprising a communication component configured to suspend the data transmission on at least one of the plurality of subcarriers based at least in part on the estimated interference.

14. The apparatus of claim 13, wherein the communication component is configured to suspend the data transmission in response to a scheduling from a base station.

15. The apparatus of claim 10, further comprising a transmission component configured to select a subcarrier for transmitting data on the uplink based at least in part on the estimated interference.

16. The apparatus of claim 10, wherein the plurality of subcarriers comprise a first set of subcarriers associated with a first wireless access technology and second set of subcarriers associated with a second wireless access technology.

17. The apparatus of claim 16, wherein the first wireless access technology comprises a long term evolution (LTE) system and the second wireless access technology is one of a code division multiple access (CDMA) system or a WiFi system.

18. The apparatus of claim 10, wherein the plurality of subcarriers comprise a plurality of discontiguous subcarriers available for a parallel data transmission on the uplink.

19. A computer program product that facilitates wireless communication, comprising:
a non-transitory computer-readable storage medium comprising code for causing at least one computer to:
determine an estimated interference associated with a data transmission over a plurality of subcarriers on an uplink;
transmit a set of information relating to the estimated interference to a base station, wherein the set of information comprises frequency locations of intermodulation products associated with the plurality of subcarriers; and
process data received over at least one subcarrier on a downlink based at least in part on the estimated interference by zeroing a log-likelihood ratio (LLR) for modulation symbols of the at least one subcarrier.

20. An wireless communications apparatus, the apparatus comprising:
means for determining an estimated interference associated with a data transmission over a plurality of subcarriers on an uplink;
means for transmitting a set of information relating to the estimated interference to a base station, wherein the set of information comprises frequency locations of intermodulation products associated with the plurality of subcarriers; and
means for processing data received over at least one subcarrier on a downlink based at least in part on the estimated interference, wherein the means for processing data received over the at least one subcarrier comprises means for zeroing a log-likelihood ratio (LLR) for modulation symbols of the at least one subcarrier.

21. A method of wireless communication, comprising:
determining an estimated interference associated with a data transmission by a wireless device over a plurality of subcarriers;
receiving an indication from the wireless device relating to frequency locations of intermodulation products associated with the plurality of subcarriers; and
assigning resources to the wireless device based at least in part on the estimated interference.

22. The method of claim 21, wherein determining the estimated interference comprises determining intermodulation products associated with the plurality of subcarriers.

23. The method of claim 21, wherein determining the estimated interference is based at least in part on the indication received from the wireless device.

24. The method of claim 23, wherein the frequency locations of the intermodulation products are related to data transmissions of the wireless device over at least a first wireless access technology and a second wireless access technology.

25. The method of claim 24, wherein the first wireless access technology comprises a long term evolution (LTE) system and the second wireless access technology is one of a code division multiple access (CDMA) system or a WiFi system.

26. The method of claim 21, wherein assigning resources to the wireless device comprises scheduling the wireless device on an uplink subcarrier.

27. The method of claim 21, wherein assigning resources to the wireless device comprises scheduling the wireless device on a downlink subcarrier.

28. An wireless communications apparatus, comprising:
a processor configured to execute computer executable components stored in a memory, the components including:
an estimation component configured to determine an estimated interference associated with a data transmission by a wireless device over a plurality of subcarriers;
a communication component configured to receive an indication from the wireless device relating to frequency locations of intermodulation products associated with the plurality of subcarriers; and
an assigning component configured to assign resources to the wireless device based at least in part on the estimated interference.

29. The apparatus of claim 28, wherein the estimation component is configured to determine intermodulation products associated with the plurality of subcarriers.

30. The apparatus of claim 28, wherein the estimation component is configured to determine the estimated interference based at least in part on the indication received from the wireless device.

31. The apparatus of claim 30, wherein the frequency locations of the intermodulation products are related to data transmissions of the wireless device over at least a first wireless access technology and a second wireless access technology.

32. The apparatus of claim 31, wherein the first wireless access technology comprises a long term evolution system and the second wireless access technology is one of a code division multiple access (CDMA) system or a WiFi system.

33. The apparatus of claim 28, wherein the assigning component is configured to schedule the wireless device on an uplink subcarrier.

34. The apparatus of claim 28, wherein the assigning component is configured to schedule the wireless device on a downlink subcarrier.

35. A computer program product that facilitates wireless communication, comprising:
a non-transitory computer-readable storage medium comprising code for causing at least one computer to:
determine an estimated interference associated with a data transmission by a wireless device over a plurality of subcarriers;
receive an indication from the wireless device relating to frequency locations of intermodulation products associated with the plurality of subcarriers; and
assign resources to the wireless device based at least in part on the estimated interference.

36. A wireless communications apparatus, comprising:
- means for determining an estimated interference associated with a data transmission by a wireless device over a plurality of subcarriers;
- means for receiving an indication from the wireless device relating to frequency locations of intermodulation products associated with the plurality of subcarriers; and
- means for assigning resources to the wireless device based at least in part on the estimated interference.

* * * * *